United States Patent [19]

Haferl

[11] Patent Number: 4,906,902
[45] Date of Patent: Mar. 6, 1990

[54] RASTER DISTORTION CORRECTED DEFLECTION CIRCUIT

[75] Inventor: Peter E. Haferl, Adliswil, Switzerland

[73] Assignee: RCA Licensing Corporation, Princeton, N.J.

[21] Appl. No.: 315,053

[22] Filed: Feb. 24, 1989

[30] Foreign Application Priority Data

Oct. 3, 1988 [GB] United Kingdom ............... 8805758
Oct. 3, 1988 [GB] United Kingdom ............... 8805757

[51] Int. Cl.[4] .......................................... H01J 29/56
[52] U.S. Cl. ................................................ 315/371
[58] Field of Search ........................................ 315/371

[56] References Cited

U.S. PATENT DOCUMENTS

| | | |
|---|---|---|
| 3,444,424 | 5/1969 | Ushikubo et al. |
| 4,206,388 | 6/1980 | Ishigaki et al. |
| 4,321,513 | 3/1982 | Knight. |
| 4,329,729 | 5/1982 | Knight. |
| 4,429,257 | 1/1984 | Haferl. |
| 4,459,517 | 7/1984 | Hicks. |
| 4,532,457 | 7/1985 | Haferl. |
| 4,565,949 | 1/1986 | Haferl. |
| 4,625,154 | 11/1986 | Willis. |
| 4,634,937 | 1/1987 | Haferl. |
| 4,687,972 | 8/1987 | Haferl .................... 315/371 |
| 4,719,392 | 1/1988 | Haferl. |
| 4,779,030 | 10/1988 | Talks et al. .............. 315/408 |
| 4,780,648 | 10/1988 | Haferl. |
| 4,794,307 | 12/1988 | Haferl. |

Primary Examiner—Theodore M. Blum
Attorney, Agent, or Firm—Joseph S. Tripoli; Joseph J. Laks; Sammy S. Henig

[57] ABSTRACT

A deflection switch of a horizontal deflection circuit is coupled to a retrace resonant circuit that includes a horizontal deflection winding and a first retrace capacitance. A flyback transformer primary winding is coupled at a junction terminal of the deflection switch and the retrace resonant circuit. A second winding of the transformer is coupled to an ultor voltage power supply. To provide side pincushion correction, a second switch, having a conduction time that is phase modulated during horizontal retrace at a vertical rate in parabolic manner, is coupled between ground and a terminal of the retrace resonant circuit remote from the flyback transformer primary winding. The second switch is conductive during the entire trace interval and is turned-off at a controllable instant during the first half of the retrace interval. When the second switch is non-conductive, a second retrace capacitance is interposed between the flyback transformer primary winding and the retrace resonant circuit to prevent load variation in the second winding of the flyback transformer from causing raster distortion.

23 Claims, 7 Drawing Sheets

FIG. 5 UNCORRECTED RECEIVER (E-W CIRCUIT INOPERATIVE)

RASTER DISTORTION CORRECTED DEFLECTION CIRCUIT

This invention relates to a deflection circuit in which the amplitude of a deflection current may be varied modulated over a relatively wide range for correcting a raster distortion. Modulation of the deflection current amplitude may be desirable for purposes such as, for example, correction of outside and of inside east-west pincushion distortion.

Typically, the horizontal deflection circuit encompasses an output stage that includes a deflection switch, a horizontal deflection winding and a trace capacitance that supplies deflection current to the deflection winding during each trace interval. A first retrace capacitance is coupled across the deflection winding during the retrace interval to form a retrace resonant circuit. Energy is replenished during retrace via a flyback transformer.

Figure 5:
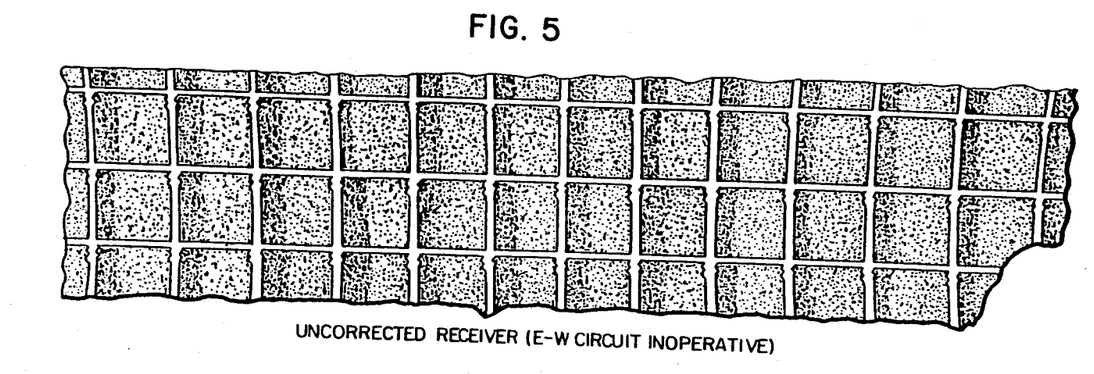
FIG. 5 illustrates a crosshatch pattern in which "mouseteeth" distortion is uncorrected.

A high beam current provided from a secondary winding of the flyback transformer, in the course of displaying, for example, each white horizontal strip of a crosshatch pattern, such as shown in FIG. 5, represents a heavy load to the flyback transformer during retrace.

In some prior art circuits, the retrace resonant circuit is coupled via a relatively small output impedance of an east-west control circuit to the primary winding of the flyback transformer throughout retrace. In such prior art circuits, the retrace capacitance may be slightly discharged during retrace due to the aforementioned loading. This may result in a discharge current from the trace capacitance into the retrace capacitance through the deflection winding and a slight drop of the voltage across the trace capacitance resulting from the white horizontal strips of the crosshatch pattern.

The charge of the trace capacitance is replenished during the retrace intervals associated with the scan lines that display the black picture portion underneath the white crosshatch stripes. This causes a small current in the opposite direction at a low frequency to flow through the deflection winding during the trace intervals. The charge and discharge current of the trace capacitance produces a small raster displacement and results in low frequency oscillations modulating the deflection winding trace current. This low frequency modulation may cause each vertical strip of the crosshatch pattern to have of a zig-zag shape, instead of a straight line shape. The zig-zag shape appears in a given vertical direction immediately below the intersection point with a horizontal strip. Such distortions occurring at such low frequency, sometimes referred to by the name "mouseteeth" distortions, are illustrated in the crosshatch pattern of FIG. 5.

Thus, mouseteeth distortions appear, during and just after the times in which high beam transients occur, because the deflection circuit, that represents a low impedance energy flywheel during retrace, supplies the transient increase in energy requirement of the ultor circuit. Thus, energy transferred from the deflection circuit to the ultor circuit may tend to cause variations in the deflection winding trace current. The nature of mouseteeth distortion and corresponding solutions are explained in U.S. Pat. Nos. 4,429,257; 4,634,937; 4,780,648 and 4,794,307 that are incorporated by reference herein.

In a horizontal deflection circuit, embodying an aspect of the invention, a modulation switching current is formed by a bidirectional modulation switch during retrace. The modulation switch, coupled to the retrace resonant circuit that includes the first retrace capacitance, has a conduction time that is phase modulated during horizontal retrace in accordance with a vertical rate parabolic voltage. A second retrace capacitor is coupled in parallel with the modulation switch. The modulation switch is conductive during the trace interval and is turned-off at a controllable instant during retrace. The modulation switch forms, when conductive, a low impedance across the second retrace capacitor that clamps the voltage across the second retrace capacitor to zero. As a result, a controllable retrace pulse voltage having an amplitude that is controllable and a width that is variable is developed across the second retrace capacitor when the modulation switch during a portion of retrace is nonconductive. The retrace voltage across the second retrace capacitor varies the magnitude of a retrace voltage that is developed across the first retrace capacitor and, in this way, provides the desired deflection winding current modulation so as to correct for outside and inside pincushion distortion.

Advantageously, by having the modulation switch conductive during only a portion of horizontal retrace, mouseteeth distortion is reduced. Mouseteeth distortion is reduced because, when the modulation switch is nonconductive during the other portion of horizontal retrace, the flyback transformer primary winding is coupled to the retrace resonant circuit via an impedance formed by the second retrace capacitor. Such impedance is high at low frequencies that are associated with mouseteeth distortion and that are substantially lower than the retrace resonant frequency. By operating the modulation switch in the switching mode, power dissipation is, advantageously, reduced.

The retrace voltage in a secondary winding of the flyback transformer may be used to provide a synchronizing feedback signal that is used for providing timing information to a phase-control-circuit. The phase-control-circuit generates a control signal that synchronizes the horizontal deflection current to a horizontal synchronizing input signal.

In accordance with a feature of the invention, the second retrace capacitance causes the flyback transformer feedback signal to be maintained in phase with respect to the retrace voltage developed across the deflection winding. Thus, the feedback signal provides a correct horizontal timing information of the horizontal deflection current throughout vertical scan. Had the retrace voltages in the flyback transformer and in the deflection winding not been maintained in phase during the entire vertical scan, a raster distortion resulting in a slightly, parabolically bent raster in the vertical direction might have occurred.

A television deflection apparatus embodying an aspect of the invention includes a source of a first input signal at a frequency that is related to a first deflection frequency and a retrace resonant circuit. The retrace resonant circuit includes a deflection winding and a first retrace capacitance. A deflection current is generated in the deflection winding and a first retrace pulse voltage is generated in the first retrace capacitance during a retrace interval of a given deflection cycle. A second retrace capacitance is coupled to the retrace resonant circuit for generating in the second retrace capacitance a second retrace pulse voltage during the retrace interval. A supply inductance coupled to a source of an input supply voltage couples the first and second retrace pulse voltages therethrough to a load circuit. A source of a modulation second input signal at a frequency that is related to a second deflection frequency is coupled to a switching arrangement. The switching arrangement varies, in accordance with the second input signal, a difference between a time when the second retrace pulse voltage is initiated and a time when the first retrace pulse voltage is initiated to produce a modulation of the deflection current. When the second retrace pulse voltage is generated, an impedance arrangement, that includes the second retrace capacitance, that is high at frequencies that are substantially lower than a retrace resonance frequency of the retrace resonant circuit, is interposed between the supply inductance and the retrace resonant circuit. The high impedance isolates the supply inductance from the retrace resonant circuit at the lower frequencies FIGS. 1a-1h illustrate idealized waveforms useful in explaining the circuit of FIG. 2;

Figure 2:
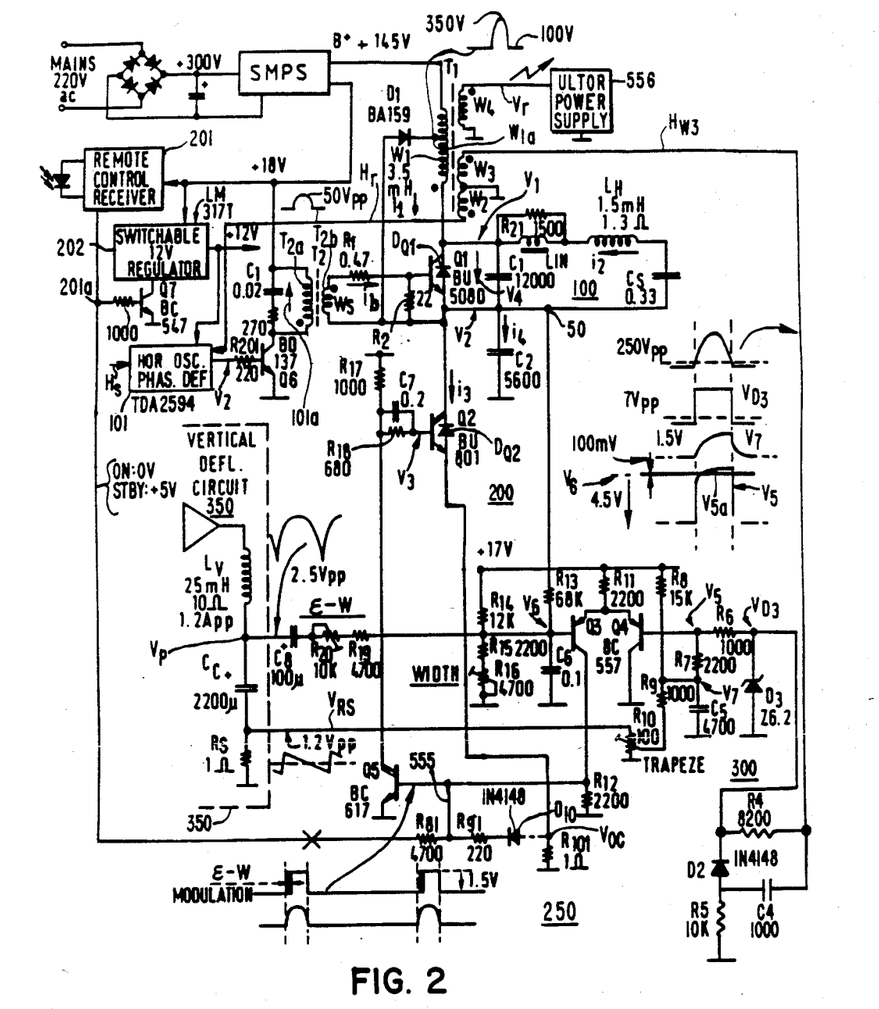
FIG. 2 illustrates a deflection circuit, embodying an aspect of the invention, that includes outside pincushion correction arrangement.

A horizontal deflection circuit 250 of FIG. 2, embodying an aspect of the invention, provides horizontal deflection in, for example, an FS color cathode ray tube (CRT) type A66EAS00X01. Circuit 250 includes a switching transistor Q1 operating at a horizontal frequency $f_H$ and an anti-parallel damper diode $D_{Q1}$, both being constructed as one integrated circuit. A retrace capacitance C1 is coupled in parallel with transistor Q1 and diode $D_{Q1}$. A deflection winding $L_H$ is coupled in series with an S-shaping trace capacitance $C_s$ to form a circuit branch that is coupled in parallel with each of transistor Q1, diode $D_{Q1}$ and retrace capacitance C1 to form a retrace resonant circuit 100 during horizontal retrace.

A phase-control stage 101 that includes a horizontal oscillator and a phase detector, not shown in detail in FIGURES, is responsive to a horizontal synchronizing signal $H_s$. Signal $H_s$ is derived from, for example, a video detector of a television receiver, not shown in the FIGURES. Stage 101 applies, via a transistor Q6, a drive voltage 101a to a primary winding $T_{2a}$ of a driver transformer T2 that is transformer coupled to a secondary winding $T_{2b}$ of transformer T2. Winding $T_{2b}$ is coupled via a voltage divider, that includes resistors R1 and R2, to the base-emitter junction of transistor Q1 for producing a base drive current $i_b$ at the horizontal frequency $f_H$ A primary winding $W_1$ of a flyback transformer T1 is coupled between a source of a B+ voltage and the collector of transistor Q1. A secondary winding $W_2$ of transformer T1 is coupled to stage 101 to provide a feedback retrace signal $H_r$ for generating drive signal 101a that synchronizes a horizontal deflection current $i_2$ in winding $L_H$ to signal $H_s$.

A switched raster correction circuit 200, embodying a feature of the invention, includes an E-W control circuit 300 that controls the switching timing of a switching transistor Q2. Transistor Q2 is conductive throughout the trace interval and becomes nonconductive during a controllable instant within the retrace interval. The collector of transistor Q2 is coupled to a junction terminal 50 between the emitter of transistor Q1 and retrace capacitor C1. The emitter of transistor Q2 is coupled to ground via a small current sampling resistor R101. A damper diode $D_{Q2}$, coupled in parallel with transistor Q2, is constructed with transistor Q2 as one integrated circuit. A second retrace capacitor C2 is coupled between the collector of transistor Q2 and the ground conductor. A retrace voltage $V_r$ generated across a winding $W_4$ of transformer T1 provides a high voltage, used for generating an ultor voltage in an ultor power supply 556 that includes rectifying diodes, not shown in the FIGURES.

A first hypothetical example that is used for explanation purpose represents a first extreme operating condition in which transistor Q2 is maintained conductive throughout trace and retrace. In this case, deflection circuit 250 generates deflection current $i_2$ in a manner that is well known but without East-West correction. As explained later on, current $i_2$ is at a maximum peak-to-peak amplitude, in this case.

A second hypothetical example that is also used for explanation purposes, represents a second extreme operating condition in which switching transistor Q2 is in cutoff throughout an entire retrace interval. In the second example, during retrace, a pair of resonant circuits are formed. The first one, resonant circuit 100 of FIG. 2, includes retrace capacitor C1, winding $L_H$ and trace capacitor $C_s$. The second one includes flyback transformer winding $W_1$ and retrace capacitor C2 that are coupled in series. Considered separately, each of the pair of retrace resonant circuits is tuned to a frequency that is lower than a required nominal retrace frequency. The resonant circuits are coupled to form a combined resonant circuit. Therefore, the resulting common retrace frequency of the combined resonant circuit is higher than each of its constituents and is made equal to the required nominal retrace frequency that is, illustratively, 43 KHz in the PAL system.

As explained before, secondary winding $W_2$ of transformer T1 provides horizontal synchronizing retrace signal $H_r$. Each pulse of signal $H_r$ represents the retrace interval in deflection winding $L_H$. Horizontal synchronizing signal $H_r$ is coupled to phase-control-stage 101 for providing feedback synchronization information. The synchronization information contained in the pulses of signal $H_r$ is indicative of the phase of current $i_2$ in deflection winding $L_H$. Signal $H_r$ and horizontal sync pulses $H_s$ are used to adjust the phase and the frequency of the horizontal oscillator output signal that is included in stage 101.

In the second hypothetical example, primary winding $W_1$ of transformer T1 is coupled to retrace resonant circuit 100 through a capacitive voltage divider that includes capacitors C1 and C2 to form the combined resonant circuit. The combined retrace resonant circuit enables proper synchronization without causing mouseteeth distortion. The advantages of forming such combined retrace resonant circuit are explained in detail in U.S. Pat. No. 4,634,937 in the name of P. E. Haferl, the current Applicant, entitled "EAST-WEST CORRECTION CIRCUIT" and incorporated by reference herein.

During trace, current $i_1$ in winding $W_1$ flows through transistor Q1 and through transistor Q2 to ground. During retrace, current $i_1$ that flows through capacitor C1 also flows through capacitor C2 as retrace current $i_4$ and causes a retrace voltage $V_2$ to be developed across retrace capacitor C2.

The amplitude of a retrace voltage $V_1$, developed across the series coupled capacitor C1 and C2 is stabilized by the B+ voltage that is regulated. Therefore, voltage $V_1$ is, advantageously, substantially unaffected by the East-West modulation. Retrace voltage $V_4$, developed across winding $L_H$ and across capacitor C1, determines the amplitude of deflection current $i_2$. Retrace voltage $V_4$ is equal to retrace voltage $V_1$ minus retrace voltage $V_2$. Because current $i_3$ in transistor Q2 is zero during the second portion of retrace when transistor Q2 is nonconductive, retrace current $i_1$ flows substantially entirely as current $i_4$ through capacitor C2 and generates retrace voltage $V_2$. It follows that in the second hypothetical example in which transistor Q2 is nonconductive throughout retrace, voltage $V_2$ is at a maximum amplitude. Consequently, voltage $V_4$ amplitude is at a minimum and deflection current $i_2$ is also at a minimum in the second hypothetical example.

In accordance with an aspect of the invention, modulation of deflection current is obtained by a modulation of the turn-off instant of transistor Q2 during the first half of the retrace interval in a way that mouseteeth distortions are reduced. By selecting the value of capacitor C1 to be, for example, approximately twice that of capacitor C2 and the value of the inductance of winding W1 to be approximately twice that of winding $L_H$, the retrace frequency remains the same during both the first portion of retrace, when transistor Q2 is conductive, and during the second portion of retrace, when transistor Q2 is nonconductive. Consequently, the phase of voltage $V_1$ in winding $W_1$ relative to that of deflection current $i_2$ is unaffected by the conduction state of transistor Q2. Modulation of the turn-off instant is permissible because both the retrace time and a retrace voltage $V_r$ developed from voltage $V_1$ in winding $W_4$ of transformer T1 are, advantageously, substantially unaffected by the state of conductance of transistor Q2, during retrace.

FIGS. 1a–1h illustrate idealized waveforms useful for explaining the operation of the circuit of FIG. 2. Similar symbols and numerals in FIGS. 2 and in FIGS. 1a–1h indicate similar items or functions.

E-W control circuit 300 of FIG. 2 generates a pulsed voltage $V_3$ which drives the base of transistor Q2. Voltage $V_3$ causes transistor Q2 to be conductive throughout the trace interval. During retrace, the falling edge of voltage $V_3$ is phase modulated in the range $t_2$–$t_3$ of FIG. 1a. Thus, switching transistor Q2 of FIG. 2 is conductive prior to time $t_2$ of FIG. 1a and switched into cut-off after time $t_2$ at the phase modulated instant within the range $t_2$–$t_3$. When conductive, transistor Q2 clamps retrace voltage $V_2$ to zero and varies the instant when the generation of voltage $v_2$ occurs.

Current $i_1$ in winding $W_1$ of transformer T1 of FIG. 2 flows into resonant circuit 100 that includes winding $L_H$ and capacitor C1. From resonant circuit 100, current $i_1$ splits and forms current $i_3$ and current $i_4$ when transistor Q2 of FIG. 2 is nonconductive. When transistor Q2 is turned-off, the decreasing current $i_4$ of FIG. 1d charges capacitor C2 of FIG. 2 until time $t_4$ of FIG. 1d, occurring at the center of the retrace interval when currents $i_1$ and $i_4$ become zero. As a result, voltage $V_2$ of FIG. 1e reaches its peak amplitude at the center of retrace. During the second half of retrace, negative current $i_4$ of FIG. 1d, that becomes increasingly more negative, discharges capacitor C2 of FIG. 2 until voltage $V_2$ becomes negative. When voltage $V_2$ becomes sufficiently negative, diode $D_{Q2}$ starts conducting and clamps voltage $V_2$ to $-0.6$ voltage, the forward voltage of diode $D_{Q2}$.

Figure 1:
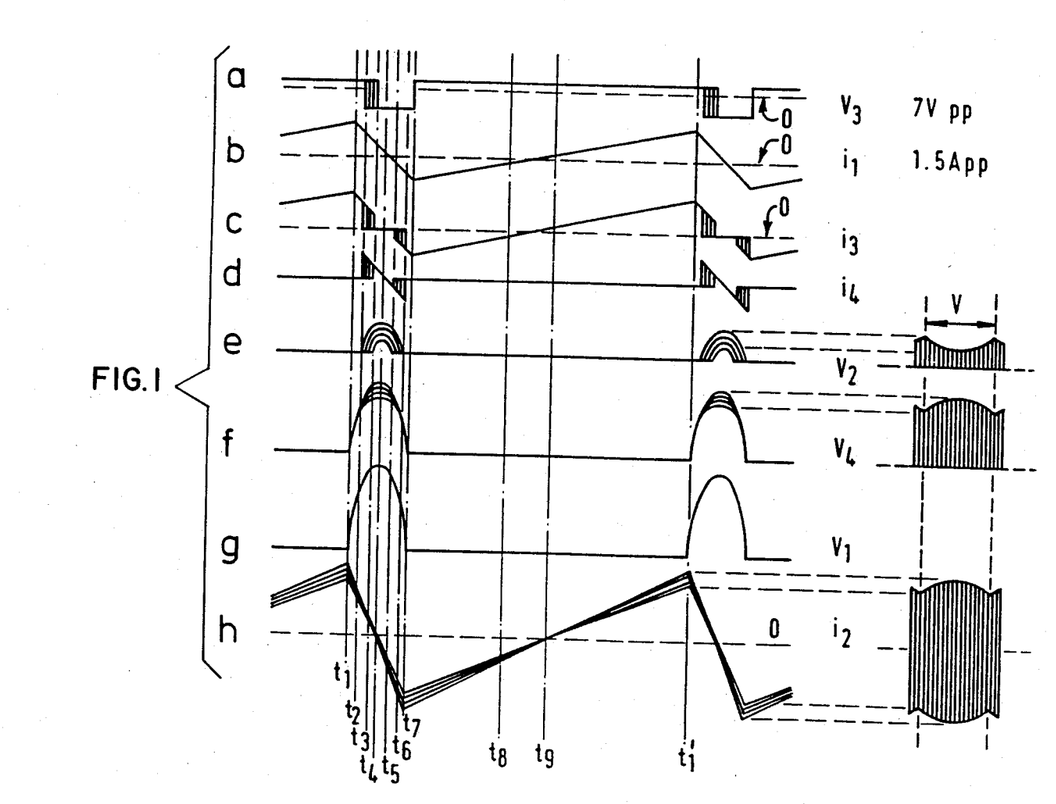

The correction of outside pincushion distortion requires a higher amplitude of deflection current $i_2$ when scanning lines at the center of the raster than at the top or bottom. At the top of the raster, transistor Q2 is turned off at time $t_2$ of FIG. 1a, that is the earliest. Voltage $V_2$ of FIG. 1e starts to increase after time $t_2$. After the center of retrace occurs, voltage $V_2$ decreases until it becomes zero at time $t_6$. Because transistor Q2 is turned off at the time $t_2$ at the top of the raster, the peak amplitude of voltage $V_2$ is at a maximum consequently, the peak amplitude of voltage $V_4$ of FIG. 1f is at a minimum. From the top toward the center of the raster, the turn-off time of transistor Q2, determined by the falling edge of voltage $V_3$ of FIG. 1a, is increasingly delayed within interval $t_2$–$t_3$. The result is a decreasing peak amplitude of voltage $V_2$ of FIG. 2, an increasing peak amplitude of voltage $V_4$ and an increasing peak amplitude of deflection current $i_2$. At the center of the raster, voltage $V_2$ starts increasing at time $t_3$ of FIG. 1e and becomes zero at time $t_5$ of each horizontal period. From the center toward the bottom of the raster, the turn-off time of transistor Q2 of FIG. 2 is increasingly advanced from time $t_3$ to time $t_2$ of FIG. 1a, resulting in an increasing voltage $V_2$ of FIG. 2, a decreasing voltage $V_4$ and a decreasing deflection current $i_2$. Thus, deflection current $i_2$ is proportional to retrace voltage $V_4$ and inversely proportional to retrace voltage $V_2$ that is modulated in accordance with the turn-off instant of transistor Q2.

The falling edge of voltage $V_3$ of FIG. 1a is phase modulated in a parabolic manner at a vertical rate to obtain the vertical rate envelopes shown in conjunction with waveforms 1e, 1f and 1h. Advantageously, the variation of the turn-off time of transistor Q2 of FIG. 2 modulates also the time when voltage $V_2$ of FIG. 1e becomes zero near the end of retrace.

In accordance with an inventive feature, the center of the retrace pulse waveform of voltage $V_2$ during horizontal retrace is maintained the same relative to the center of horizontal retrace time $t_4$ throughout vertical scan. Thus, voltages $V_4$ and $V_2$ of FIG. 2 are maintained in phase with respect to voltage $V_1$. It follows that, advantageously, signal $H_r$ is maintained in phase with deflection current $i_2$.

Signal $H_r$ developed across winding $W_2$ provides phase information of the phase of deflection current $i_2$. Signal $H_r$ is applied to stage 101 for synchronizing the horizontal oscillator of stage 101 to sync pulses $H_s$ of the video signal. Because capacitor C2 couples winding $W_1$ to winding $L_H$ to form a combined resonant circuit, the phase information of signal $H_r$ is substantially identical to that of deflection current $i_2$. A further advantage provided by the switched operation of transistor Q2 is that inductive components are not required to be coupled in series with transistor Q2. Also, the switched operation of transistor Q2 results in low power dissipation in transistor Q2. Therefore, transistor Q2 may not require a heat sink. An additional advantage over other east-west circuits such as a conventional diode modulator is that deflection current $i_2$ does not flow through a damper diode during the second half of trace, resulting in lower deflection losses and lower asymmetric linearity error.

As explained before, during retrace, deflection resonant circuit 100 is coupled to flyback transformer T1 by capacitor C2 having a high impedance, after transistor Q2 becomes nonconductive. When transistor Q2 becomes nonconductive, the ultor voltage rectifying diodes, not shown, are conducting. The high impedance of capacitor C2 substantially isolates windings $L_H$ and $W_1$ at frequencies associated with mouseteeth distortion that are substantially lower than the retrace frequency of resonant circuit 100 during retrace; thereby, raster distortions known as "mouseteeth" are prevented from occurring.

In accordance with a feature of the invention, a junction terminal 50 between capacitors C1 and C2 is clamped to ground potential by transistor Q2 during the entire trace interval. Therefore, raster disturbances referred to as "Organ Pipes" do not appear. Organ Pipes type raster disturbances may occur if such clamping were not used as a result of oscillatory current or ringings in the flyback transformer primary current. Such ringings are suppressed because transistor Q1 is clamped to ground by transistor Q2 during the entire trace interval.

Advantageously, damper diode $D_{Q1}$ and $D_{Q2}$ may be constructed with the corresponding transistor using the integrated circuit technology for further reducing the required discrete components count.

A protection diode D1 is coupled between the collector of transistor Q2 and a terminal W1a of primary winding $W_1$ of transformer T1. Diode D1 protects transistor Q2 from excessive peak voltage that may occur when power is initially turned on. Transistor Q2 is protected by diode D1 which limits voltage $V_2$ to a maximum of 350V. Transformer T2 has, preferably, 400V isolation capability between the primary and secondary windings.

A remote control receiver 201 generates an on/off control signal 201a that is coupled to an on/off transistor switch Q7 of a +12V regulator. When transistor Q7 is nonconductive, an output supply voltage +12V is generated that causes phase-control-stage 101 to be energized during power-up. When transistor Q7 is conductive, stage 101 is de-energized that causes stand-by mode operation. During a transition to the stand-by mode of operation, phase-control-stage 101 that supplies base drive to the base of transistor Q6 causes driver transistor Q6 of transformer T2 to be turned-off.

After, for example, the transition from normal operation to the stand-by mode operation there may still be energy stored in primary winding $T_{2a}$ of transformer T2 of FIG. 2. This energy may continue producing base current $i_b$ in deflection transistor Q1 until a magnitude of voltage 101a across primary winding $T_{2a}$ of transformer T2 decreases to zero. As a result, a final deflection cycle maybe generated with an extended but undefined time duration that ends when transistor Q1 ceases to conduct. Consequently, currents $i_1$, $i_2$ and $i_3$ might increase excessively and destroy transistors Q1 and Q2.

To prevent such a possibility, on/off control signal 201a is coupled through a resistor R81 and a conductor 555 to the base electrode of a transistor Q5 that provides base drive to transistor Q2, causing transistor Q2 to turn off immediately after the power-on-to-standby transition. Since both transistors Q1 and Q2 are coupled in series, turning off transistor Q2 causes the current in both transistors to cease. Thus transistors Q1 and Q2 are protected. However, such fast shut-down arrangement may require a fast spot suppression circuit to prevent a beam spot related damage to the CRT, not shown.

An alternative protection arrangement, in which the aforementioned fast spot suppression circuit, advantageously, may not be required is also shown in FIG. 2. In such preferred arrangement, a feedback arrangement that includes a series arrangement of a diode D10 and a resistor R91 is coupled between the emitter of transistor Q2, as shown by the dashed line, and the base of transistor Q5, via conductor 555. When such feedback arrangement is used, the emitter of transistor Q2 is coupled to ground via a current sampling resistor R101 causing current $i_3$ to be sampled across resistor R101. A resulting voltage $V_{oc}$ developed across resistor R101 controls the base voltage of transistor Q5. When voltage $V_{oc}$ across resistor R101 exceeds +1.8V, transistor Q5 is turned on by voltage $V_{oc}$ and reduces the base drive of transistor Q2. Thus, current $i_3$ is limited to a peak of 1.8 ampere when, for example, resistor R101 equals 1 ohm.

The feedback provided by diode D10 and resistor R91, advantageously, protects both transistors Q1 and Q2 that are coupled in series during operation and, in particular, during the power-up-to-standby transition. It should be understood that such feedback arrangement may also be used together with, or instead of the arrangement in which signal 201a is coupled to the base of transistor Q5 that was explained before. When, for example, both arrangements are used together, current $i_3$ may become substantially reduced to, for example, zero for providing the required over-current protection or for providing on/off operation.

Figure 6A:
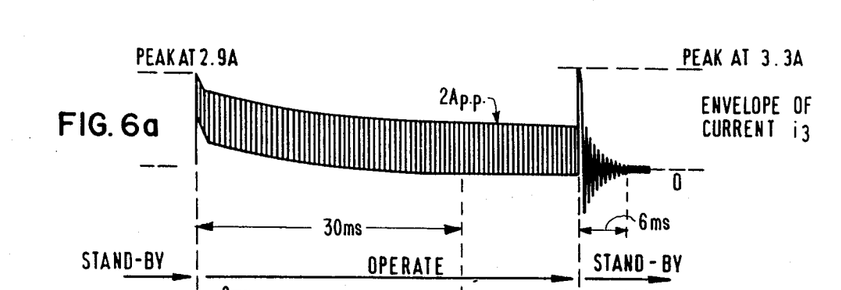
FIGS. 6a-6d illustrate waveforms useful in explaining a current protection feature of the circuit of FIG. 2.
Figure 6B:
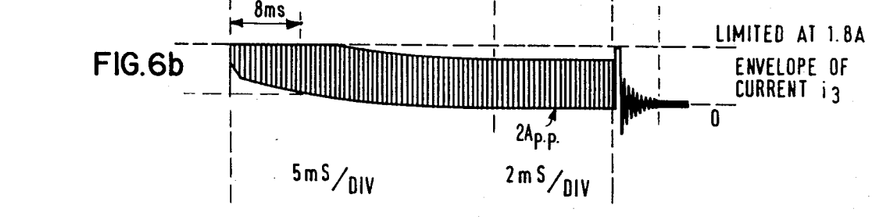
Figure 6C:
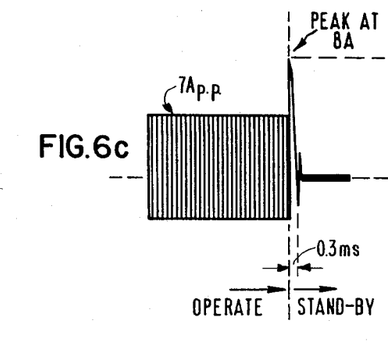
Figure 6D:
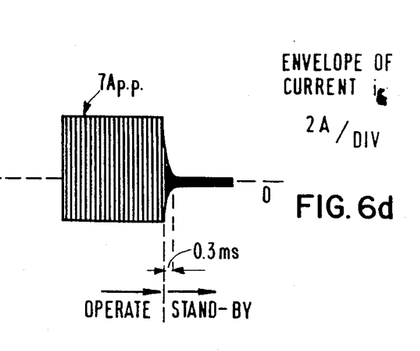

FIG. 6a illustrates an envelope of a waveform of current $i_3$ of FIG. 2 immediately after corresponding transitions between normal operation power-up mode and standby mode without the protection circuit, that would occur if conductor 555 were disconnected for disabling the operation of the protection circuit. Similarly, FIG. 6b illustrates the envelope of the waveform of current $i_3$ of FIG. 2 when conductor 555 is connected that enables the operation of the protection circuit. Note that current $i_3$ of FIG. 6b is limited to the maximum of 1.8 amperes. Likewise, FIG. 6c illustrates an envelope of collector current $i_6$ of Q1 (of FIG. 2 when the protection circuit is disabled and FIG. 6d illustrates the envelope of current $i_6$ of FIG. 2 when the protection circuit is enabled. The operation of the protection circuit is also discussed in U.S. patent application No. 315,087, entitled PROTECTION ARRANGEMENT OF A DEFLECTION CIRCUIT, in the name of the same Applicant, filed concurrently herewith and incorporated by reference herein.

E-W control circuit 300 of FIG. 2 includes a differential amplifier formed by transistors Q3 and Q4 and Darlington driver transistor Q5 which drives switching transistor Q2. The differential amplifier that includes transistors Q3 and Q4 compares a vertical parabola voltage $V_6$ to an exponentially shaped ramp portion $V_{5a}$ of a voltage $V_5$ having a waveform that is shown in FIG. 2. The crossover points of the compared voltages determines the timing of control voltage $V_3$ of FIG. 1a.

To develop voltage $V_5$ of FIG. 2, horizontal retrace pulses $H_{w3}$ of FIG. 2, developed in a winding $W_3$ of transformer T1, are coupled via a resistor R4 to a zener diode D3. A speed-up network that includes a capacitor C4, a resistor R5 and a diode D2 generates a gating pulse $V_{D3}$ across diode D3 having a leading edge with a fast rise time. Faster leading edge, results, advantageously, in a larger dynamic range of E-W control circuit 300. Pulse $V_{D3}$ across diode D3 is applied via resistors R6 and R7 to a capacitor C5 and to a resistor R9 for generating the exponentially shaped ramp portion $V_{5a}$ of voltage $V_5$. Pulsed voltage V5 that includes exponentially increasing top portion $V_{5a}$ is applied to the base of transistor Q4. A vertical rate parabolic voltage $V_p$ of FIG. 2 that includes a superimposed sawtooth voltage is coupled from a DC blocking capacitor $C_c$ of a conventional vertical deflection circuit 350 to the base of transistor Q3 via a capacitor C8, a resistor R20 and a resistor R19. Resistors R14, R15 and R16 provide dc bias to the base of transistor Q3. Voltage $V_2$ that is coupled via a resistor R13 to the base of transistor Q3 and to an integrating capacitor C6 provides a negative feedback, causing the vertical rate envelope of voltage $V_2$ to track parabolic voltage $V_p$ that is developed in capacitor $C_c$.

A vertical sawtooth voltage $V_{RS}$ developed across a sampling resistor $R_s$ is coupled, via a resistor R10 and a resistor R9, to a capacitor C5 for developing a voltage $V_7$ having an exponential upramping portion at a peak amplitude that is determined by voltage $V_{RS}$. Voltage $V_7$ is coupled to the base of transistor Q4 of control circuit 300. In this way, Voltage $V_{RS}$ is also coupled via capacitor $C_c$ to the base of transistor Q3. Because voltage $V_{RS}$ is applied in a differential manner, voltage $V_{RS}$ is prevented from substantially affecting the switching operation of transistors Q3 and Q4. A vertical parabola voltage $V_6$ developed at the base of transistor Q3 is compared to horizontal ramp voltage $V_5$. The crossover points of voltages $V_5$ and $V_6$ determine the timing of the leading and trailing edges of voltage $V_3$, as indicated before.

Exponentially shaped ramp portion $V_{5a}$ of voltage $V_5$ linearizes the east-west modulator circuit 200 by compensating for the decreasing level of current $i_1$ of FIG. 1b, during retrace. Linearization occurs because a small amount of modulation of voltage $V_3$ near time $t_2$ of FIG. 1a results in a higher amplitude modulation of voltage $V_2$ of FIG. 1e than the same amount of modulation of voltage $V_3$ near time $t_3$ of FIG. 1a. This is so because the amplitude of each of currents $i_1$ and $i_4$ of FIGS. 1b and 1d, respectively, is higher at time $t_2$ than at time $t_3$ and because voltage $V_2$ is proportional to the value of $\int i_4 \cdot dt$. The exponentially shaped ramp voltage $V_5$ is steeper near time $t_2$ than at time $t_3$ of FIG. 1g. Consequently, for a given voltage variation at the base of transistor Q3, the the modulation of voltage $V_3$ is smaller around time $t_2$ than around time $t_3$. Thus the exponentially shaped ramp portion $V_{5a}$ of voltage $V_5$ linearizes the operation of E-W raster correction circuit 200. Resistor R15 raises the dc average of voltage $V_5$. Compensation of picture width variations as a function of beam current, that may be referred to as anti-breathing, may be applied via the base of transistor Q3.

Figure 3:
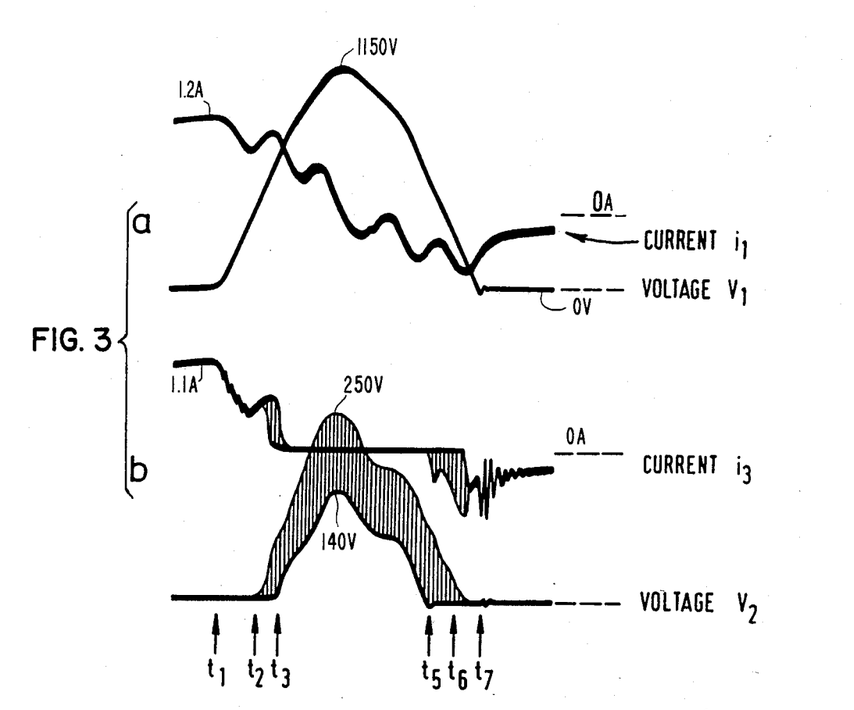
FIGS. 3a-3b illustrate waveforms occurring during horizontal retrace that are useful in explaining the circuit of FIG. 2.
Figure 4:
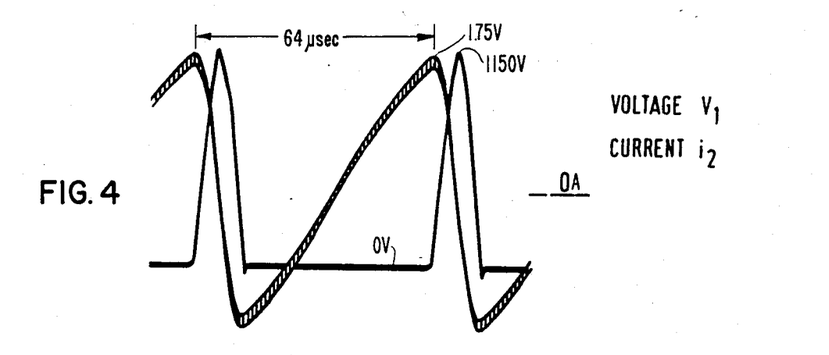
FIG. 4 illustrates additional waveforms that are useful in explaining the operation of the circuit of FIG. 2.

FIGS. 3a–3b and 4 illustrate waveforms obtained in operating circuit 250 of FIG. 2. Similar symbols and numerals in FIGS. 1a–1h, 2, 3a–3b and 4 indicate similar items or functions. Advantageously, voltage $V_1$ of FIG. 3a and current $i_1$ are substantially unmodulated. Between time $t_2$ and $t_3$ of FIG. 3b transistor Q2 of FIG. 2 is switched to cutoff. Diode $D_{Q2}$ starts conducting between time $t_5$ and $t_6$ of FIG. 3b. Advantageously, voltage $V_2$ of FIG. 3b is centered around the center of voltage $V_1$ of FIG. 3a. When voltage $V_2$ of FIG. 3b is generated, current $i_3$ of FIG. 3b is zero. Note that deflection current $i_2$ of FIG. 4 is modulated to provide outside pincushion distortion correction.

Transistor Q5 of FIG. 2, having a base that is coupled to the junction of a load resistor R12 and a collector of transistor Q3, applies a base drive to transistor Q2 from a load resistor R17 that is coupled to the collector of transistor Q5. The collector of transistor Q5 is coupled via a parallel arrangement of a capacitor C7 and a resistor R18 for generating a fast transition of a falling edge portion of voltage $V_3$ to obtain a fast turn-off of transistor Q2. The fast turn-off allows interrupting current $i_3$ immediately after time $t_1$ of FIG. 1c and allows using the full modulation range between time $t_1$ and $t_4$. Illustratively, the turn-off delay of transistor Q2 of FIG. 2 is less than 1 microsecond. The use of a MOSFET in place of Q2 may further reduce the turn-off delay. The fast turn-off feature may be desirable in a situation that requires a deflection current at, for example, a higher frequency such as $2xf_H$.

Figure 7:
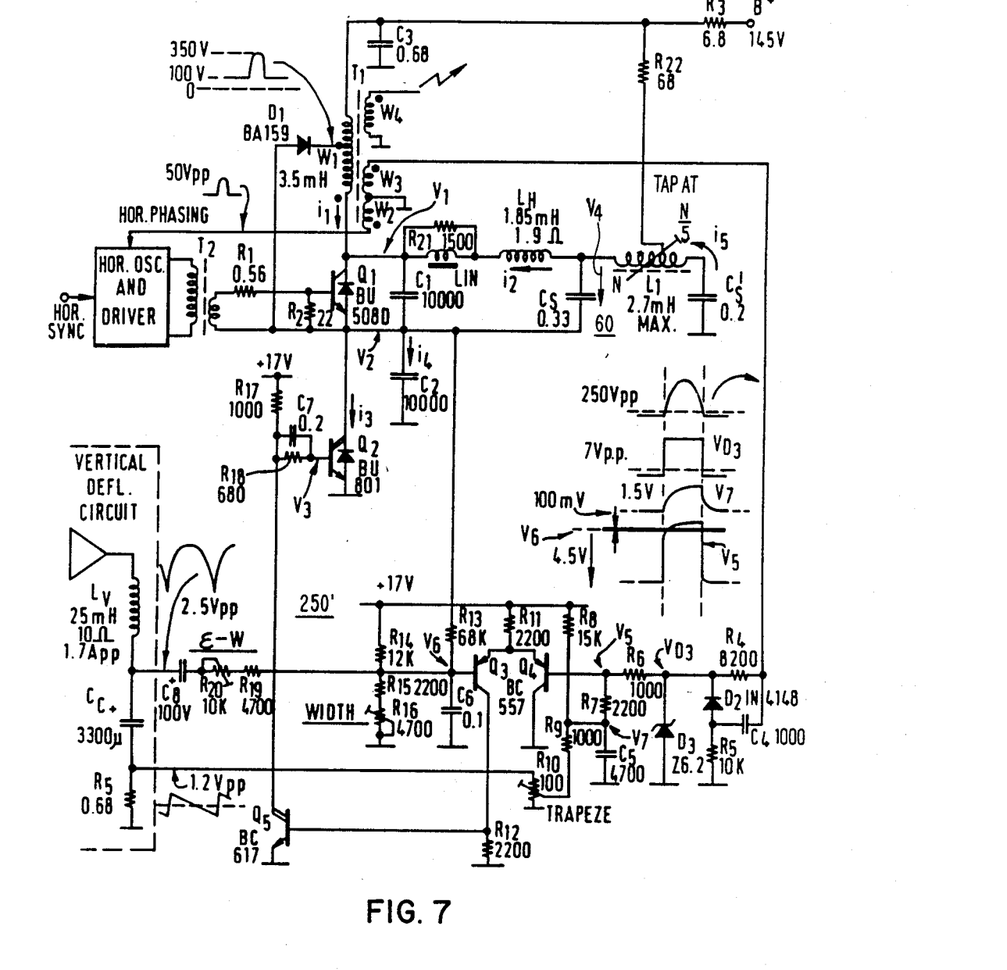
FIG. 7 illustrates a second embodiment of the invention that includes inside pincushion distortion correction.

FIG. 7 illustrates a horizontal deflection circuit 250' that is similar to circuit 250 of FIG. 2 and that is used for providing horizontal scanning in, for example, a Philips 45AX Picture tube, not shown. Similar numbers and symbols in FIGS. 7 and 2 indicate similar items or functions. However, circuit 250' of FIG. 7 provides, in addition to outside pincushion correction that is provided as explained before with respect to FIG. 2, also inside pincushion correction. Inside pincushion correction is obtained by the operation of a resonance circuit 60 that includes an inductor L1, a capacitor $C'_S$ and that is coupled to a resistor R22. An inside pincushion correction modulation current $i_5$, modulated by voltage $V_2$, flows through trace capacitor $C_S$ and through transistor Q2. Current $i_5$ modulates the trace voltage across capacitor $C_S$. The amount of inside correction may be adjusted by adjusting the value of inductor L1. This adjustment, however, is not critical, and a fixed coil of, for example, 2.2 mH may be used. The required value of capacitor C2 of FIG. 7 is greater than that in the circuit of FIG. 2 because inductor L1 of FIG. 7 is coupled in parallel with winding $W_1$ of transformer T1 during retrace. The manner by which a current such as current $i_5$ is modulated to provide inside pincushion correction is described in more detail in U.S. Pat. No. 4,719,392, entitled RASTER CORRECTION CIRCUIT, in the name of P. E. Haferl that is incorporated by reference herein.

Figure 8:
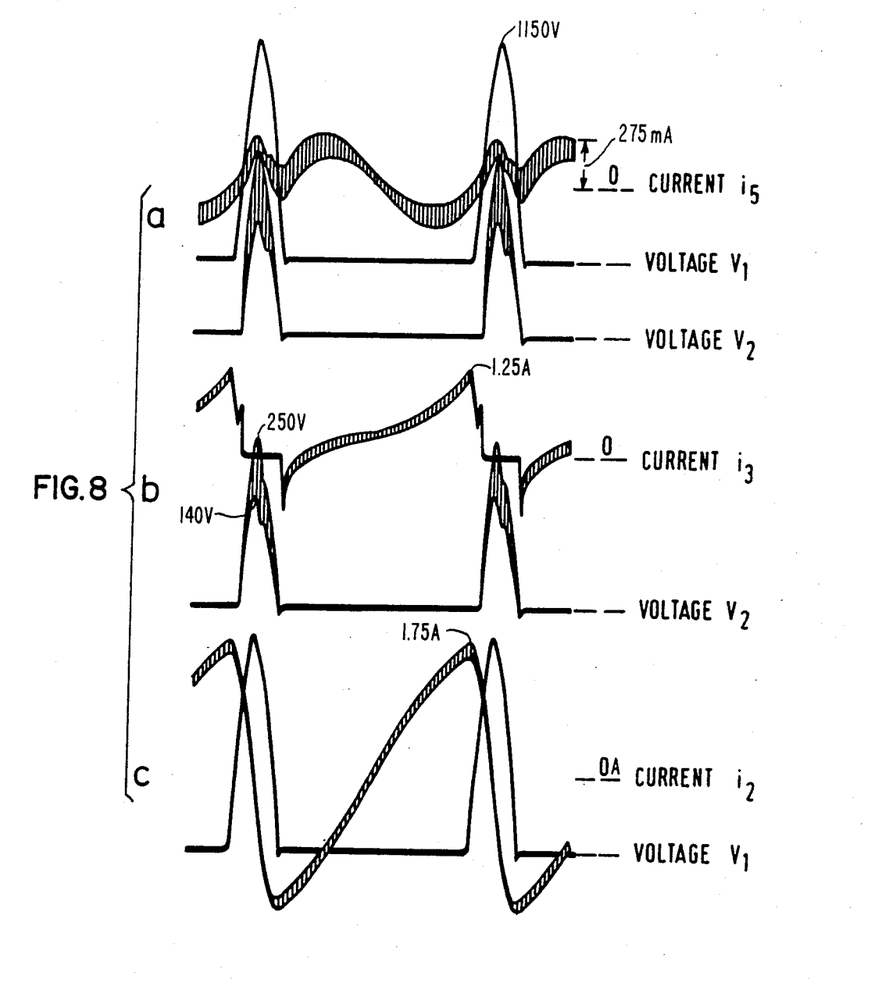
FIGS. 8a-8c illustrate waveforms associated with the circuit of FIG. 7.

FIGS. 8a–8c illustrate waveforms obtained during operation of circuit 250' of FIG. 7. Similar numerals and symbols in FIGS. 8a–8c and 7 illustrate similar items or functions. Note that current $i_1$ of FIG. 8b is anti-"S"-shaped during trace, as a result of current $i_5$ of FIG. 7. Without inside pincushion correction, current $i_3$ would have basically increased in a linear manner, as ideally shown in FIG. 1c. Advantageously, transistor Q2 of FIG. 7 also provides a current path for current $i_5$, during trace. Note that both currents $i_5$ of FIG. 8a and current $i_3$ of FIG. 8b are modulated to provide inside pincushion distortion correction.

What is claimed:
1. A television deflection apparatus, comprising:
   a source of a first input signal at a frequency that is related to a first deflection frequency;

a retrace resonant circuit, including a deflection winding and a first retrace capacitance;

first switching means responsive to said first input signal and coupled to said retrace resonant circuit for generating a deflection current in said deflection winding and a first retrace pulse voltage in said first retrace capacitance during a retrace interval of a given deflection cycle;

a second retrace capacitance coupled to said retrace resonant circuit for generating in said second retrace capacitance a second retrace pulse voltage during said retrace interval;

a source of an input supply voltage;

a load circuit;

a supply inductance coupled to said source of input supply voltage and to said first switching means for coupling said first and second retrace pulse voltages therethrough to said load circuit and for replenishing energy losses in said retrace resonant circuit during said retrace interval;

a source of a modulation second input signal; and second switching means responsive to said first and second input signals and coupled to said second retrace capacitance for varying, in accordance with said second input signal, a time difference between initiation of said second retrace pulse voltage and initiation of said first retrace pulse voltage to produce a modulation of said second deflection current such that when said second retrace pulse voltage is generated, an impedance arrangement, is interposed between said supply inductance and said retrace resonant circuit said impedance arrangement including said second retrace capacitance and exhibiting a high impedance at frequencies that are substantially lower than a retrace resonance frequency of said retrace resonant circuit for isolating said supply inductance from said retrace resonant circuit at said lower frequencies.

2. An apparatus according to claim 1 wherein said high impedance arrangement reduces mouseteeth distortions when a variation in said load circuit occurs.

3. An apparatus according to claim 1 wherein, during an interval when said second retrace pulse voltage is generated, said second retrace capacitance and said supply inductance form a series arrangement that is coupled in parallel with a parallel arrangement that includes said first retrace capacitance and said deflection winding.

4. An apparatus according to claim 1 wherein said second switching means bypasses said second retrace capacitance during a portion of said first retrace pulse voltage outside an interval when said second retrace pulse voltage is generated and wherein a resonance frequency of a combined resonant circuit that includes said supply inductance, said deflection winding said first retrace capacitance and said second retrace capacitance is substantially the same throughout said first retrace pulse voltage.

5. An apparatus according to claim 1 wherein said second switching means produces a variation of a pulse width of said second retrace pulse voltage in accordance with said second input signal such that a phase difference between corresponding predetermined portions of said first and second retrace pulse voltages remains substantially constant when said pulse width of said second retrace pulse voltage varies for maintaining a third retrace pulse voltage, generated in said supply inductance, in correct synchronization with said deflection current when said pulse width of said second retrace pulse voltage varies.

6. An apparatus according to claim 1 wherein said supply inductance comprises a primary winding of a flyback transformer and wherein said load circuit comprises an ultor voltage power supply that is coupled to and energized by a high voltage developed in a second winding of said transformer, said ultor voltage power supply forming a load that varies in accordance with a beam current variation at said frequencies that are substantially lower than said retrace resonance frequency.

7. An apparatus according to claim 1 wherein said second switching means operates in a conductive state during a first portion of said first retrace pulse voltage for applying a low impedance across said second retrace capacitance that delays the generation of said second retrace pulse voltage and wherein said second switching means operates in a nonconductive state for removing said low impedance to enable the generation of said second retrace pulse voltage during a second portion of said first retrace pulse voltage.

8. An apparatus according to claim 7 wherein said second portion follows said first portion during a given retrace interval.

9. An apparatus according to claim 7 wherein a retrace resonance frequency of a combined resonant circuit that includes said deflection winding, said supply inductance and said first and second retrace capacitances is maintained substantially the same when said second switching means is conductive and when said second switching means is nonconductive.

10. An apparatus according to claim 7 wherein said second switching means is conductive until said first portion of said first retrace pulse voltage having a length that varies in accordance with said second input signal has elapsed to form a low impedance between a pair of terminals of said second retrace capacitance during said first portion for preventing the generation of said second retrace pulse voltage, in accordance with said second input signal, as long as said second switching means is conductive and wherein said second switching means is nonconductive following said first portion for enabling the generation of said second retrace pulse voltage.

11. An apparatus according to claim 1 wherein said supply inductance comprises a winding of a flyback transformer that is coupled through said second retrace capacitance to said retrace resonant circuit when said second switching means is nonconductive and that is coupled through said second switching means when said second switching means is conductive to form a combined retrace resonant circuit having a resonance frequency that is substantially unchanged when said second switching means is conductive and when it is nonconductive.

12. An apparatus according to claim 11 further comprising, a phase-control-stage responsive to said first input signal and to a feedback retrace pulse voltage that is developed in said flyback transformer for generating a control signal that is coupled to a control terminal of said first switching means, wherein a phase difference between said feedback retrace pulse voltage and said deflection current is maintained constant when said second input signal varies.

13. An Apparatus according to claim 1 wherein said second switching means is coupled in series with said first switching means during a portion of said given deflection cycle and in parallel with said second retrace capacitance and wherein said second retrace capacitance is coupled to a first junction terminal between said first and second switching means and in series with said first retrace capacitance.

14. An apparatus according to claim 1 wherein each of said first and second switching means comprises a diode and a transistor coupled in an anti-parallel manner that forms an integrated circuit.

15. An apparatus according to claim 1 wherein an amplitude of said second retrace pulse voltage varies in accordance with said second input signal when said second retrace pulse voltage varies that causes an amplitude of said first retrace pulse voltage to vary for modulating said deflection current.

16. An apparatus according to claim 1 further comprising, a trace capacitance that is coupled to said deflection winding to form a first trace resonant circuit during a trace interval of said deflection cycle and a second trace resonant circuit that is coupled to said trace capacitance to provide an inside pincushion distortion correction wherein said second retrace pulse voltage, developed in said second retrace capacitance when said second switching means is nonconductive, generates an inside pincushion distortion correction modulation current in said second trace resonant circuit that is modulated in accordance with said second retrace pulse voltage.

17. A apparatus according to claim 1 wherein each of said first and second switching means operates at a horizontal rate and wherein said second switching means becomes nonconductive, within said retrace interval, at an instant that varies at a vertical rate parabolic manner for varying an amplitude of said second retrace pulse voltage in a manner that provides pincushion distortion correction.

18. An apparatus according to claim 1 further comprising, means coupled to said retrace resonant circuit for generating, during a horizontal retrace interval, a substantially square wave pulse having an exponentially shaped top portion, said square wave pulse being coupled to a first input terminal of a differential amplifier of an East-West raster correction control circuit, a second input terminal of said amplifier being responsive to a signal at a vertical rate, for producing, at an output terminal of said differential amplifier, a modulation signal that is coupled to a control terminal of said second switching means having a phase that varies in accordance with said vertical rate signal, wherein said top portion of said square wave pulse voltage varies in a manner that improves the linearity of said East-West raster correction control circuit with respect to variations of said vertical rate signal.

19. An apparatus according to claim 1 wherein said second switching means modulates said deflection current to provide both inside and outside pincushion distortion correction.

20. An apparatus according to claim 1 further comprising, means for generating a control signal at a horizontal rate having a phase, during said retrace interval, that varies in a vertical rate parabolic manner wherein said second switching means is responsive to said control signal for varying a pulse width of said second retrace pulse voltage when said phase of said control signal varies.

21. An apparatus according to claim 1 wherein said second retrace pulse voltage has a phase that remains substantially constant relative to said first retrace pulse voltage.

22. A deflection apparatus with raster distortion correction, comprising:
a source of a first input signal at a frequency that is related to a horizontal deflection frequency;
a retrace resonant circuit including a deflection winding and a first retrace capacitance;
a first transistor switch responsive to said first input signal and coupled to said retrace resonant circuit for generating a horizontal deflection current in said deflection winding and a first retrace pulse voltage in said first retrace capacitance;
a second retrace capacitance coupled in series with said retrace resonant circuit for generating in said second retrace capacitance a second retrace pulse voltage;
a source of a second input signal at a frequency that is related to a vertical deflection frequency;
means responsive to said first and second input signals for generating a control signal at a horizontal frequency having a phase that varies in accordance with said vertical deflection frequency; and
a second switch coupled to said first transistor switch such that during a portion of a given cycle of said deflection current that occurs during a trace interval said first transistor switch and said second switch are coupled in series, said second switch being responsive to said control signal and coupled to said second retrace capacitance for producing a variation of a time when said second retrace pulse voltage is initiated relative to a time when said first retrace pulse voltage is initiated while maintaining substantially constant a phase difference between the two retrace pulse voltages.

23. An apparatus according to claim 22 wherein a center point between said time when said second retrace pulse voltage is initiated and a time when said second retrace pulse voltage is terminated remains substantially in phase with said first retrace pulse voltage.

* * * * *